United States Patent [19]
Bubniak et al.

[11] 3,818,933
[45] June 25, 1974

[54] MASS FLOW AIR METER

[76] Inventors: William C. Bubniak, 4077 Middlebury Dr., Troy, Mich. 48084; Louis W. Huellmantel, 32886 Haff St., Warren, Mich. 48093; Harry R. Mitchell, 2907 Whittier Dr., Bloomfield Hills, Mich. 48013

[22] Filed: Nov. 19, 1973

[21] Appl. No.: 417,297

Related U.S. Application Data
[62] Division of Ser. No. 278,958, Aug. 9, 1972.

[52] U.S. Cl.................. 137/503, 251/208, 251/305
[51] Int. Cl.......................................... F16k 31/365
[58] Field of Search ............ 251/208, 305, 306, 58; 137/503

[56] References Cited
UNITED STATES PATENTS
2,990,848    7/1961    Wilson et al...................... 137/503

*Primary Examiner*—Henry T. Klinksiek
*Attorney, Agent, or Firm*—Arthur N. Krein

[57] ABSTRACT

A mass flow air meter for use in a mass air flow type electronic fuel injection system for an engine to measure mass air flow through an air induction system including a scheduled area valve consisting of a butterfly valve cooperating with scheduled valve throat area openings whereby the pressure drop in the induction passage through this valve is held approximately constant during changes in fluid flow by allowing the valve throat area openings to vary.

5 Claims, 5 Drawing Figures

MASS FLOW AIR METER

This is a division of application Ser. No. 278,958 filed Aug. 9, 1972.

This invention relates to a variable area fluid meter and, in particular, to a mass flow air meter for use in a mass air flow type electronic fuel injection system.

Fuel injection systems generally use the basic control principle of proportioning the fuel flow to the quantity of air being consumed by the engine. Therefore, to have good air-fuel ratio control, the engine air flow must be measured accurately. Most present fuel injection systems measure the air flow indirectly by the so-called speed-density method. In this method it is assumed that the engine air flow is proportional to the engine speed and the air-density in the intake manifold and is measured indirectly by calibrating the pumping capability of the engine as by sensing intake manifold air-density (in terms of absolute manifold pressure) and engine speed to proportion fuel flow. These two parameters, speed and pressure, are quite easily measured and provide strong signals which are then used to determine the fuel flow requirements.

Although the speed-density metering method is quite satisfactory for such applications as racing engines, it may not provide sufficiently accurate air-fuel ratio control over the entire engine operating range to aid in the reduction of exhaust emissions. The primary reason for this is that it is extremely difficult to account for changes in engine volumetric efficiency with speed. Thus, for the same intake manifold density, it is possible to have a different air charge per combustion cycle at different engine speeds due to manifold tuning, valve overlap and other factors which affect engine volumetric efficiency as a function of engine speed. In order for a speed-density electronic fuel injection system to effect proper fuel metering, the electronic controller of such a system must attempt to compensate for these above-mentioned factors affecting metering. This is not easily accomplished with precision nor does such compensation apply similarly for each engine. In addition, engine deterioration such as valve and ring wear, camshaft wear and exhaust system change can affect the calibration of the system and result in improper air-fuel metering control.

For these reasons, it is desirable to measure the air flow directly if accurate air-fuel control is required to effect a reduction of exhaust emissions. A venturi, such as used in carburetors, provides a means of direct air flow measurement since the air flow is proportional to the venturi area and the square root of the pressure drop across the venturi. However, there are certain undesirable characteristics of venturis, primarily in regard to their size limitation and flow resistance. In order to provide adequate signals at small air flow rates, the venturi must be relatively small. However, a small venturi results in an excessive pressure drop at high air flow. This dilemma can be overcome by using venturis in parallel, for example, to provide a separate idle and low load system for the engine. This alternative, however, requires the blending of one system to another which in turn introduces other metering problems.

If the venturi is replaced by a variable area device, such as a valve, the metering area for measuring air flow can be controlled to provide an acceptable pressure drop at all air flow rates. However, with this arrangement it becomes necessary to know the valve area and flow co-efficient along with the pressure drop across the valve in order to determine the air flow rate. For the purposes of this application, the product of the geometric valve area and the flow co-efficient will be referred to as the "effective area" of the valve. Therefore, when using such a valve, the air metering accuracy of such a valve is only as good as the accuracy in measuring the effective valve area. In an electronically controlled fuel injection system, the valve position, which is related to the valve area, can be measured by a potentiometer or position transducer connected to the valve shaft. However, since there would be some inherent inaccuracy in measuring the valve position due for example to inaccuracies in the potentiometer, a valve area measurement error would exist. The important parameter relative to the area measurement is the fractional or percent error in effective area measurement since this determines the metering error.

A common butterfly-type valve is unsatisfactory for use in such an air metering unit for a fuel injection system since the geometric area of a common butterfly-type valve increases rapidly at small valve angle during opening of the valve so that effective area measurement errors are thus greatest at lower air flows whereas the greatest need for air metering accuracy in a fuel injection system exists at the lower air flow range to effectively control exhaust emissions.

It is therefore the principal object of this invention to provide a mass flow air meter for use in a mass air flow type electronic fuel injection system to effect accurate measurement of air flow to effect good air-fuel ratio control.

Another object of this invention is to provide a mass flow air meter for use in a mass air flow type electronic fuel injection system to accurately measure mass air flow through an engine air horn by the use of a scheduled area valve.

These and other objects of the invention are attained by means of a mass flow air meter having a straight edged valve plate rotatably mounted in a cross bore in the air meter housing to control air flow through a pair of contoured holes of continuous profile extending from opposite sides of the air meter housing and running out at the cross bore, one of the contoured holes being inverted with respect to the other contoured hole, the valve plate being operated by a servo motor which derives its power from the air pressure drop across the valve plate.

For a better understanding of the invention, as well as other objects and further features thereof, reference is had to the following detailed description of the invention to be read in connection with the accompanying drawings, wherein.

Before describing the specific structural details of the mass flow air meter of the invention, a mass flow type electronic fuel injection system using the subject mass flow air meter will be described with reference to the schematic and functional block diagram of FIG. 1 and the schematic block diagram of FIG. 2 to provide a basis for a better understanding of the function of the mass flow air meter in such a system. Specific details of various portions of the electronic circuit of this system are not described since they form no part of the subject invention.

Figure 1:
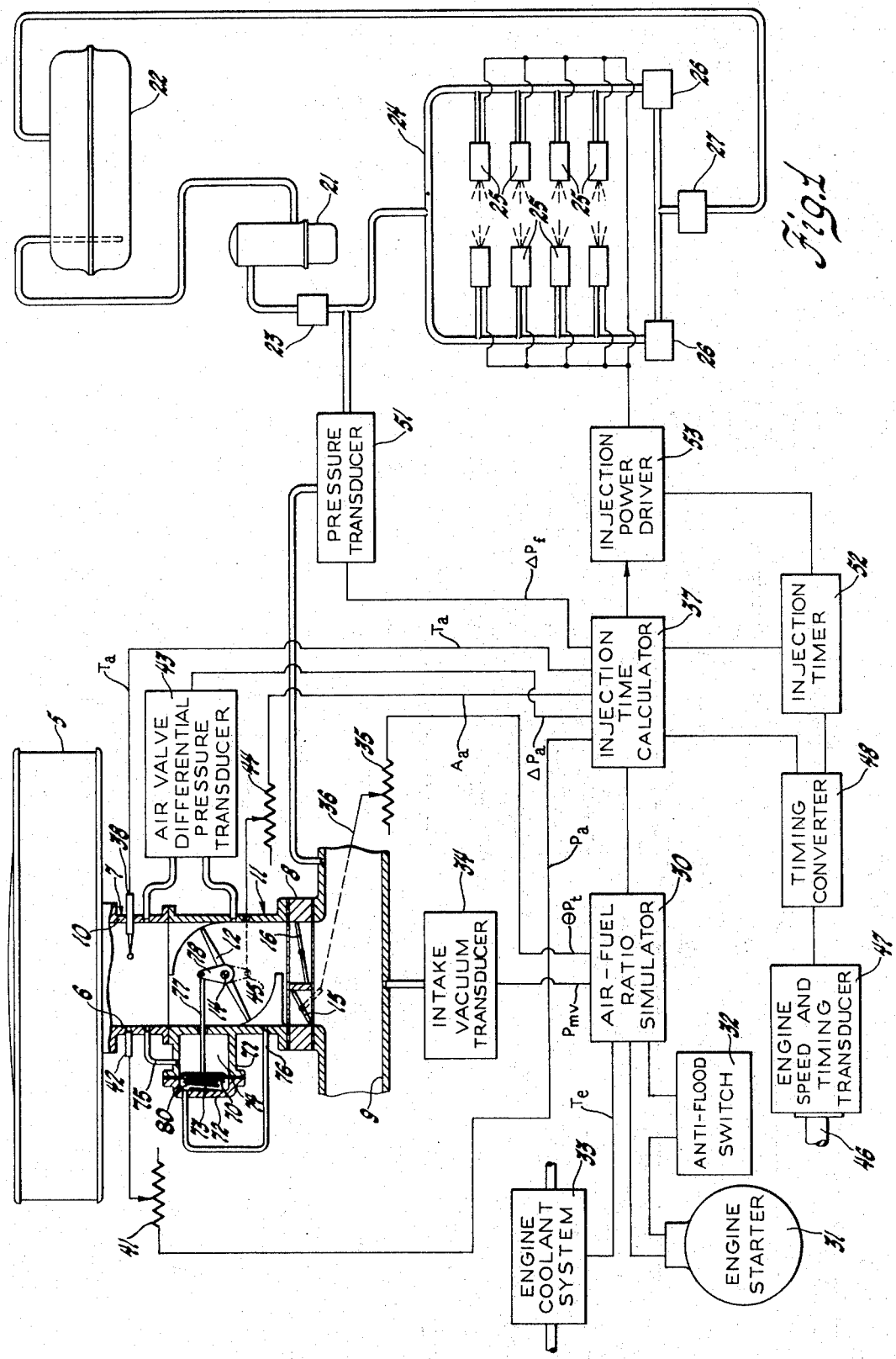
FIG. 1 is a schematic and functional block diagram of a mass flow electronic fuel injection system for an internal combustion engine utilizing a mass flow air meter in accordance with the invention.

Referring now to FIG. 1, air to an internal combustion engine is supplied through an air filter 5 and the induction passage 6 in an air meter assembly, generally designated 7, and through a throttle controlled air induction unit 8 to the intake manifold 9 of the engine to supply air to the combustion chambers, not shown. The air meter 7, for purposes of illustration, includes an air horn 10 and a scheduled air valve 11, the air valve being provided with contoured holes extending from opposite ends thereof with the flow therethrough controlled by a valve 12 mounted on a rotatable shaft 14. The air induction unit 8 is provided with primary and secondary intake bores controlled respectively by a primary throttle valve 15 and a secondary throttle valve 16, both adapted to be operated by the usual throttle pedal.

Fuel for the engine is delivered by the fuel pump 21, with internal pressure relief, from fuel tank 22 through a filter 23 and a fuel supply rail 24 to individual fuel injectors 25 for each of the cylinders of the engine, eight such fuel injectors being shown in the embodiment illustrated. The opposite ends of the fuel supply rail 24 are in communication with one or more accumulator fuel pulsation dampers 26 which in turn are in communication via a suitable relief valve 27 with the fuel tank for return of excess fuel to it.

The fuel injectors 25 may be of any suitable type so that fuel is metered by controlling the injection duration from each injector for the individual combustion chambers as controlled by the electronic fuel injection system as a function of engine operating conditions in a manner to be described.

The fuel injection system shown controls the air-fuel ratio to the engine by measuring the actual engine air flow and proportioning the fuel to the air flow. The fuel is metered, as described above, by controlling the duration of injection from each injector at the individual engine cylinders. The air flow is measured by means of the mass flow air meter 7, to be described in detail hereinafter. The total air flow is used to determine the air flow per cycle by taking into account the engine speed and the number of cylinders of the engine. In addition, the desired air-fuel ratio is varied as a function of engine temperature, load and the rate of change of engine speed, both accelerating and decelerating.

The desired air-fuel ratio signals are electronically provided by means of an air-fuel ratio simulator 30 which receives a signal from the engine starter 31 and a conventional anti-flood switch 32 circuit, a signal $T_e$ of engine temperature from the engine cooling system 33, for example, a signal $P_{mv}$ of intake manifold pressure in manifold 9 as sensed by an intake vacuum transducer 34 and a signal indicating the throttle 15 position for a fuel enrichment signal $\theta P_t$ from the throttle position transducer 35 actuated by link 36 connected to the primary throttle 15.

The air-fuel ratio simulator 30 provides an electrical signal to an electronic injection time calculator 37 which also receives signals from the mass air flow meter of mass air flow to the engine, these signals indicating the inlet air temperature $T_a$ as sensed by an inlet air temperature transducer 38 extending into the induction passage 6 in the air horn 10 above the air valve 11, the inlet air pressure $P_a$ as sensed by an inlet air pressure transducer 41 through the aneroid barometer 42, the pressure differential $\Delta P_a$ across the air valve 11 as sensed by an air valve differential pressure transducer 43 and the valve 12 angular position, indicating the inlet area uncovered by the valve 12, by an air valve position transducer 44 through a lever 45 mounted on the shaft 14 supporting the valve 12.

In addition, engine speed in terms of the engine crankshaft 46 speed is sensed by an engine speed and timing transducer 47 to provide a signal of engine speed and a basic synchronization signal for the fuel injection as a function of the engine operating cycle through a timing converter 48 and a differential fuel-manifold pressure transducer 51 is used to provide a signal $\Delta P_f$ to the injection time calculator 37 of the differential pressure of fuel supplied to the injectors and of air in the intake manifold.

The timing converter 48 also supplies a signal to an injection timer 52 which in turn supplies a signal to the injection time calculator 37. The injection time calculator 37 is then used to provide a signal which together with a signal from the injection timer 52 is used as the input to the injection power driver 53 to provide properly timed power pulses of the required duration to each of the fuel injectors 25.

Figure 2:
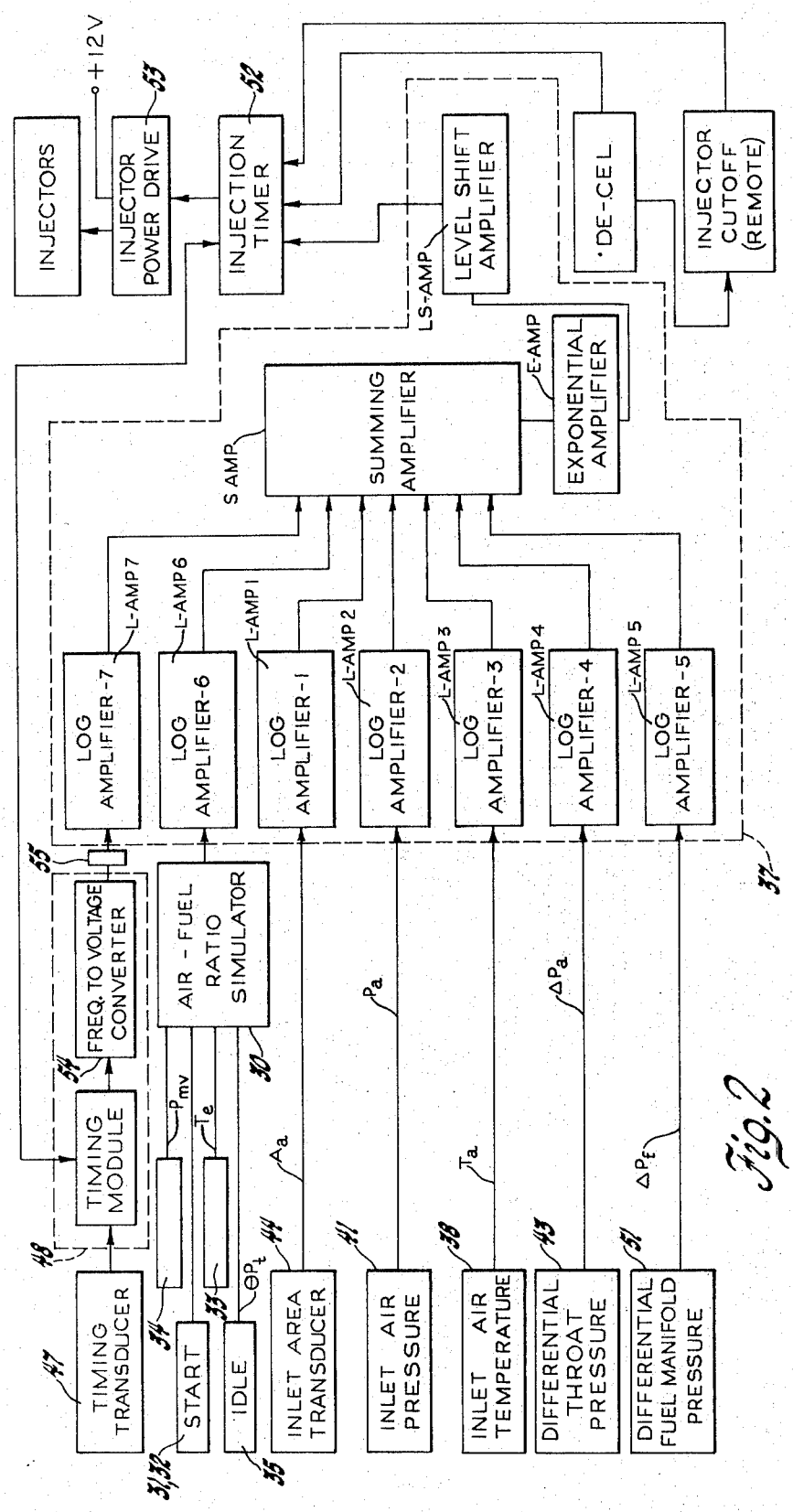
FIG. 2 is a schematic block diagram of the electronic circuit portion of the fuel injection system of FIG. 1.

The system block diagram of the electronic circuit of the fuel injection system of FIG. 1 is shown in FIG. 2. The signal flow is shown from left to right starting with the transducers at the extreme left. The transducers 44, 41, 38, 43 and 51 for inlet area $A_a$, inlet air pressure $P_a$, inlet air temperature $T_a$, differential pressure $\Delta P_a$ and differential fuel-manifold pressure $\Delta P_f$, respectively, feed their signals directly to log amplifiers L-AMP1 through L-AMP5, inclusive. Four inputs, the engine temperature $T_e$, the throttle position $P_t$, intake manifold pressure $P_{mv}$ and the ignition switch position are used by the air-fuel ratio simulator 30 to generate a "desired" air-fuel ratio signal for input to the log amplifier L-AMP6 in the injection time calculator 37.

The remaining transducer, that is, the engine speed and timing transducer 47, provides the basic synchronization signal for correlating fuel injections with the engine operating cycle. Eight pulses are produced in this transducer 47 per engine cycle with each pulse providing a reference for a different cylinder fuel injector 25. The eight timing pulses are also combined by digital "and" circuits in the timing module in the timing converter 48 to form a pulse train which is integrated in a frequency to voltage converter 54 therein to produce an analogue signal proportional to engine speed. This signal is fed through a low pass filter 55 to reduce the ripple and then passed on to a log amplifier L-AMP7 in the injection time calculator 37. The output from these log amplifiers passes to a summing amplifier S-AMP, then to an exponential amplifier E-AMP and then to a level shift amplifier LS-AMP, all within the injection time calculator 37. The output from the level shift amplifier LS-AMP is an analogue voltage representing the calculated injection time and is then converted to a digital pulse for controlling the injector pulse duration in the injection timer 52. In addition, the injection timer receives a trigger signal from the timing converter 48 module. The injector power driver 53 is basically a semi-conductor switch that connects the coils of the injectors 25 across the car battery voltage source for a period determined by the "on" time on the signal from the injection timer 52.

Figure 3:
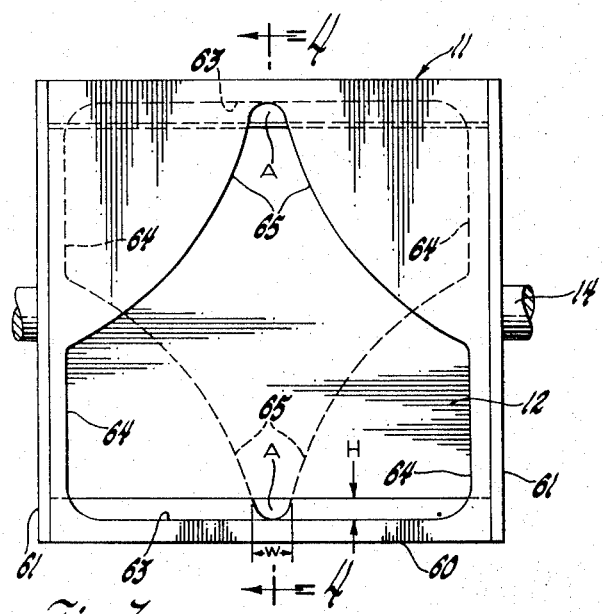
FIG. 3 is a bottom view of the scheduled air valve only of the mass flow air meter assembly of FIG. 1.
Figure 4:
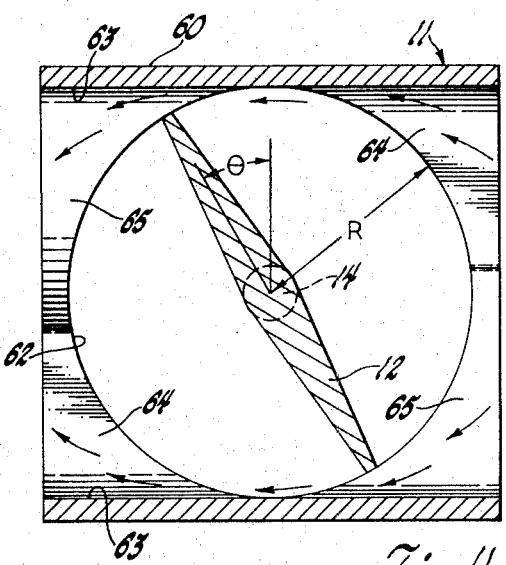
FIG. 4 is a sectional view taken along lines 4—4 of FIG. 3.
Figure 5:
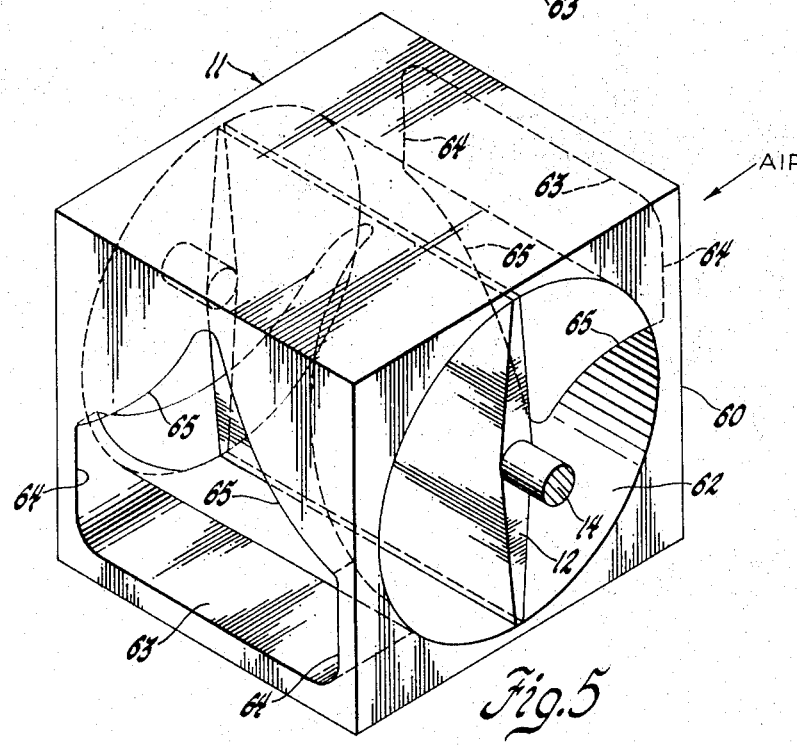
FIG. 5 is a perspective view of the air valve of FIG. 3 with parts removed to show the details of this valve structure.

Referring now to the mass air flow meter of the invention with particular reference to FIGS. 3, 4 and 5, the scheduled air valve 11 consists of an internal contoured housing 60, the rectangular valve blade or plate 12 mounted on the valve shaft 14 journalled for rotation in the two side covers 61 of the housing 60. The valve plate rotates in a hole 62 of suitable diameter in the valve housing 60 perpendicular to the air flow path. The two side covers 61 seal the bored hole at the sides of the valve housing and also serve to rotatably support the valve shaft 14. On one end of the housing end surface there is provided a contoured hole of continuous profile which runs out at the housing bore. At the opposite side of the housing is an identically sized but inverted contoured hole which also runs out at the housing bore. As best seen in FIG. 5, each of the contoured holes, in the embodiment illustrated, includes a straight wall portion 63 joining at opposite ends with straight side wall portions 64, each of which joins with converging curved wall portions 65.

When the valve plate 12 is in a closed position, horizontally with reference to FIG. 1 and vertical with reference to FIGS. 4 and 5, no contoured hole area is exposed at either edge of the valve plate. As the valve plate 12 is rotated in a counterclockwise direction as viewed in FIG. 3 or 4, two equal areas of the contoured holes are uncovered, one at each end of the plate as seen in FIG. 3. Again with reference to this same figure, each of these areas is formed by the edge of the valve plate 12 and the curved wall portions 65 formed in the contoured hole in the valve housing 60. The size of the uncovered area for a given valve plate angle and diameter of bore depends upon the average width of the opening. As a result, innumerable valve area-angle relationship can be obtained simply by incorporating the desired contour in the valve housing so as to control the percentage change in flow area for a fixed incremental change in valve angle to a constant value.

In the embodiment illustrated, the contoured hole is shaped such that the flow area as defined by the contoured hole and the edge of the valve plate is somewhat triangular in shape but with somewhat curved sides formed by the curved wall portions 65 of the contoured hole and with the edge of the valve plate 12 forming the base of the triangular shaped orifice flow area. For this valve arrangement, the total flow area $A = Ao + 2HW$, wherein:

$Ao$ is the area when the valve plate angle $\theta$ is zero, that is, with the valve plate closed, and is the leakage area around the valve and the flow area of a separate bypass, if desired;

$H$ is the vertical distance or height between the edge of the valve plate and the apex of the triangular flow area side walls; and, $W$ is the average width of the exposed area.

Since two similar areas are exposed, the total flow area exposed includes twice the product of $H$ and $W$, as reflected in the above expression for total flow area.

The distance $H$ is also defined by the valve plate angle $\theta$ and the radius $R$ of the valve plate, as follows:

$$H = R(1 - \cos\theta)$$

With this arrangement, as the valve plate is opened, a flow area is uncovered which is defined by a segment of the contoured hole in the housing and a radial edge of the valve plate 12. The total flow area uncovered for any given valve plate position is comprised of two diametrically opposite flow area orifices as described above. As previously mentioned, the scheduling of fluid flow area to meet specific air flow requirements for a particular type engine is achieved by defining the shape of the contoured hole, as desired. This is a relatively simple procedure since the controlling orifice area uncovered by the valve plate is always in a plane parallel to the continuous cross section of the contoured hole. The mechanism for controlling the flow area is analogous to the method used in a simple sliding plate valve in which a flat plate with a hole therethrough is uncovered by a second flat plate.

The straight-through flow path through the contoured housing 60 with large areas immediately upstream and downstream from the controlling orifice areas serve to minimize flow restriction and a pressure drop in the fluid. In addition, with this arrangement, the valve plate 12 is essentially pressure balanced so that the power requirements for positioning the valve plate are minimized.

Referring again to FIG. 1, a servo mechanism is used to position the valve 12 to maintain essentially a constant depression across this valve, as desired, over most of the range of engine operation. As shown schematically in this figure, the servo mechanism includes a diaphragm 70 mounted between the housing 71 and cover 72 to form therewith chambers 73 and 74 on opposite sides of the diaphragm. Chamber 73 is connected by a conduit 76 to the induction passage downstream of the valve 12 while chamber 74 is connected to the induction passage 6 by passage 75 upstream of valve 12. A control rod 77 is fixed at one end to the diaphragm 70 for movement therewith, this rod extending through a sealed aperture in the housing 71 with its opposite end pivotally connected to a lever arm 78 fixed to the valve shaft 14. A spring 80, with a predetermined force as desired, is positioned within chamber 73 to normally maintain the diaphragm 70 in a neutral position as shown in FIG. 1. With this arrangement, any change in the depression across the air valve will be detected by the servo mechanism and the air valve will be adjusted accordingly.

What is claimed is:

1. An air valve for use in an engine air induction system having throttle means for controlling air flow therethrough, said air valve including a housing in the system upstream of the throttle means, a cross bore in said housing, a first contoured hole of continuous profile extending from one surface of said housing and running out at said cross bore, a second contoured hole of continuous profile, inverted with respect to said first contoured hole, extending from the opposite surface of said housing and running out at said cross bore, a straight edged valve plate rotatably mounted in said cross bore for movement between closed and open positions relative to said contoured holes, said valve plate when in an open position defining with said contoured holes a pair of air flow areas the size of which increases at a predetermined fixed rate relative to the valve plate angle and, a servo mechanism responsive to air pressure upstream and downstream of said valve plate operatively connected to said valve plate to effect movement of said valve plate to maintain a constant depression across said valve plate.

2. A mass flow air meter valve for use in the induction passage of an internal combustion engine comprising a housing, a cross bore through said housing, side plates secured to opposite sides of said housing to enclose said cross bore, a first contoured hole of continuous profile extending from one surface of said housing to run out at said cross bore, a second contoured hole of continuous profile, inverted with respect to said first contoured hole, extending from the opposite face of said housing to run out at said cross bore, a shaft journalled in said side plates and extending through said cross bore concentrically therewith, a valve plate fixed to said shaft for rotation in said cross bore between closed and open positions relative to said contoured holes, said valve plate when in an open position defining with said first and second contoured holes a pair of air flow areas, the size of which increases in a predetermined relation to the angular opening position of said valve plate so that equal increments of valve plate rotation will provide equal percentage change in air flow and, a servo mechanism responsive to air pressure upstream and downstream of said valve plate operatively connected to said shaft to effect movement thereof and of said valve plate upon a change in the air flow depression across said valve plate.

3. A flow control valve including a valve body having a cross bore therethrough, side covers secured to opposite sides of said valve body to enclose said cross bore, a first contoured hole of continuous profile extending from one surface of said valve body to run out at said cross bore, a second contoured hole of continuous profile, identical in size but inverted with respect to said first contoured hole, extending from the opposite surface of said valve body to run out at said cross bore, a shaft journalled in said side covers and extending through said cross bore concentrically therewith, a rectangular valve plate fixed to said shaft for rotation in said cross bore about the axis of rotation of said shaft for movement between a closed position and a full open position relative to said first contoured hole and said second contoured hole, said valve plate when in a position other than said closed position defining, with said contoured holes, two flow areas, each flow area being defined by a segment of one of said contoured holes and a radial edge of said valve plate and, a servo mechanism responsive to air pressure upstream and downstream of said valve plate operatively connected to said shaft to effect movement thereof and of said valve plate upon a change in the air flow depression across said valve plate.

4. A flow control air valve including housing means having an enclosed cylindrical cavity therein of a predetermined axial length defined by an annular inner peripheral wall and opposed side walls in said housing means, a first contoured hole of continuous profile extending from an outer surface of said housing means through said inner peripheral wall, a second contoured hole of continuous profile, identical in size but inverted with respect to said first contoured hole, extending from an opposite outer surface of said housing means through said inner peripheral wall, a shaft rotatably journalled in said housing means to extend through said cylindrical cavity concentric therewith, a flat valve plate of a length and width corresponding to the diameter and length of said cylindrical cavity fixed to said shaft for rotation in said cylindrical cavity about the axis of rotation of said shaft whereby said valve plate is moved between a closed position and a full open position relative to said contoured holes, said valve plate as it is moved toward said full open position defining with said contoured holes a pair of flow areas, each of said flow areas being defined by a segment of one of said contoured holes and a radial edge of said valve plate and, a servo mechanism responsive to air pressure upstream and downstream of said valve plate operatively connected to said valve plate to effect movement of said valve plate to maintain a constant depression across said valve plate.

5. A flow control valve including housing means having an enclosed cylindrical cavity therein of a predetermined diameter and of a predetermined axial length defined by an annular inner peripheral wall and opposed side walls in said housing means, a first contoured hole extending from an outer surface of said housing means to run out at said inner peripheral wall, a second contoured hole of continuous profile extending from an opposite outer surface of said housing means to run out at said inner peripheral wall, said second contoured hole being identical to but inverted relative to said first contoured hole, a shaft rotatably journalled in said housing means and extending coaxially through said cylindrical cavity, a valve plate within said cylindrical cavity, said valve plate being of a length and width complementary to the diameter and length of said cylindrical cavity, and being fixed to said shaft for rotation therewith about the axis of rotation of said shaft whereby one radial edge of said valve plate is moved between a closed position and a full open position relative to said first contoured hole and the opposite radial edge of said valve plate is simultaneously moved between a closed position and a full open position relative to said second contoured hole, whereby two flow areas are uncovered, each of said flow areas being defined by a segment of one of said contoured holes and a radial edge of said valve plate and, a servo mechanism operatively connected to said valve plate and responsive to air pressure upstream and downstream of said valve plate to effect movement of said valve plate to maintain a constant depression across said valve plate.

* * * * *